Jan. 9, 1923.  
M. T. WESTON,  
RESILIENT WHEEL.  
FILED JAN. 30, 1919.

WITNESSES

INVENTOR  
Milton T. Weston  
BY  
ATTORNEYS

Jan. 9, 1923.

M. T. WESTON.
RESILIENT WHEEL.
FILED JAN. 30, 1919.

M. T. WESTON.
RESILIENT WHEEL.
FILED JAN. 30, 1919.

WITNESSES

INVENTOR
Milton T. Weston
BY
ATTORNEYS

Fig.13.

Patented Jan. 9, 1923.

1,441,958

UNITED STATES PATENT OFFICE.

MILTON T. WESTON, OF NEW YORK, N. Y.

RESILIENT WHEEL.

Application filed January 30, 1919. Serial No. 274,024.

*To all whom it may concern:*

Be it known that I, MILTON T. WESTON, a citizen of the United States, residing at New York, county and State of New York, have invented certain new and useful Improvements in Resilient Wheels, of which the following is a specification.

This invention relates to resilient wheels in which tread and axle units are movable relatively to each other in the plane of the wheel against the resistance offered by a resilient member such as a pneumatic tube which opposes their departure from concentric relation. According to Patent Number 1289586, which was granted to me on December 31st, 1918, and on which the present invention constitutes an improvement, the relatively movable axle and tread units are pivotally connected by articulated expansible connections which are enabled to properly transmit torque from one unit to the other by means of said resilient member or pneumatic tube which in all operative positions of the axle and tread units, maintains a substantially equal resilient force against all of said expansible connections. The object of my present invention is to provide an improved construction and arrangement of parts in the wheel described and claimed in the above identified patent to increase its efficiency and durability as well as its speed and load-carrying capacity. In order to offer greater resistance to torque and departure from concentric position between the axle and tread units, without, at the same time, increasing the pressure of the air in the pneumatic tube, means are provided for permanently maintaining said tube with a flattened cross section so as to render a larger pressure area available for resisting the movements of the expansible connections which pivotally connect said units. Inasmuch as the radial space occupied by the tube is considerably reduced from what it would occupy with a circular cross section, it will be understood that a pneumatic tube of larger cross section with its increased total air capacity is made available without increasing the size of the wheel which is thereby enabled to carry a greater load and to better transmit torque from one unit to the other. The improved torque which is thus obtained, results in better braking effects due to a brake drum secured to the axle-engaging unit. Certain other features of constructional details will appear in the specification and be referred to in their peculiar relationships in the claims. In the drawings is shown a preferred embodiment of my invention.

Figure 5:
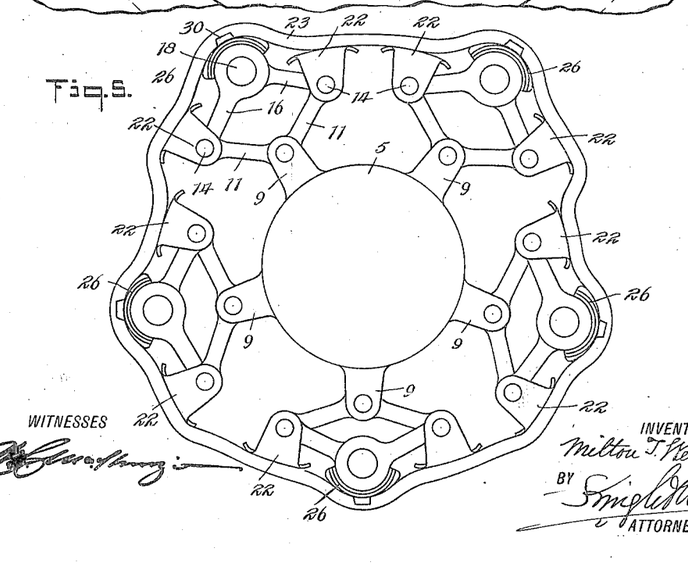
Figure 5 is a side elevation of the expansible system of links and levers, showing the relative positions of the parts when the axle-engaging unit is depressed with respect to the tread unit.
Figure 6:
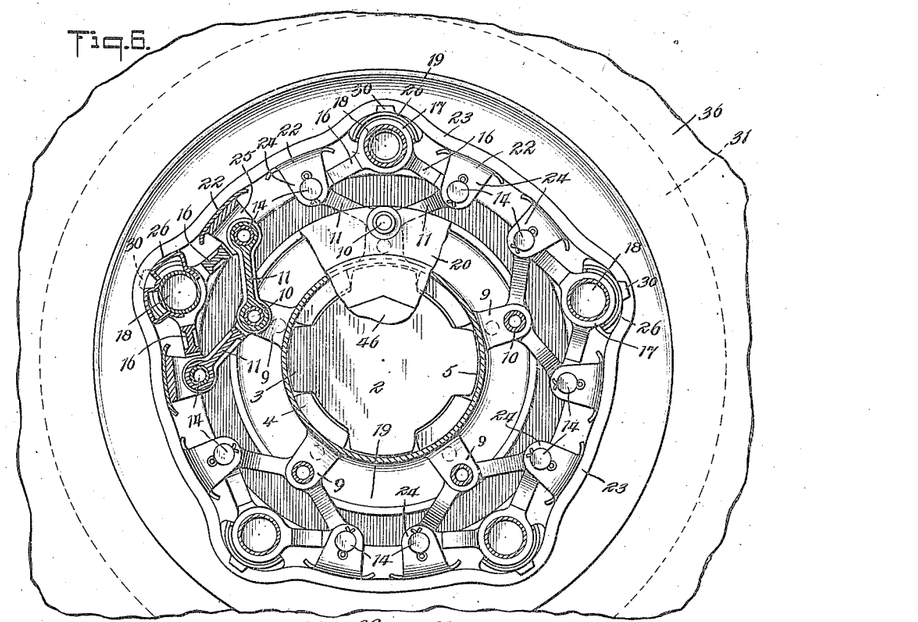
Figure 6 is a somewhat similar view, parts being broken away and parts shown in section.
Figure 7:
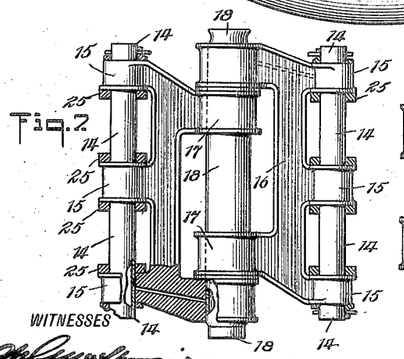
Figure 7 is a side elevation of one pair of levers removed, parts being broken away and parts shown in section.
Figure 8:
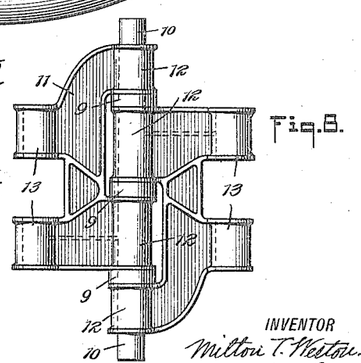
Figure 8 is a side elevation of one pair of connecting links removed.
Figure 9:
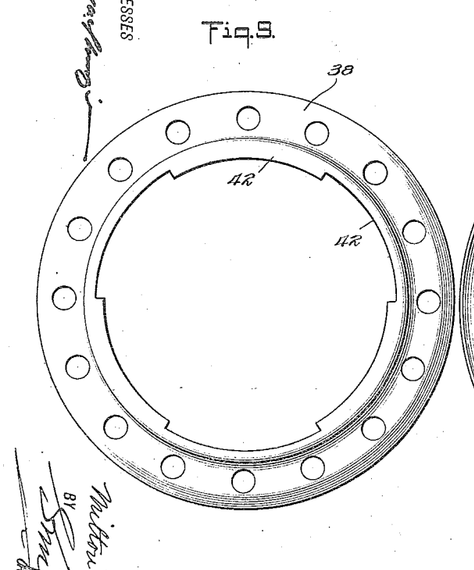
Figure 9 is a side elevation of the locking ring before it has been secured to the inner periphery of the outside web.
Figure 10:
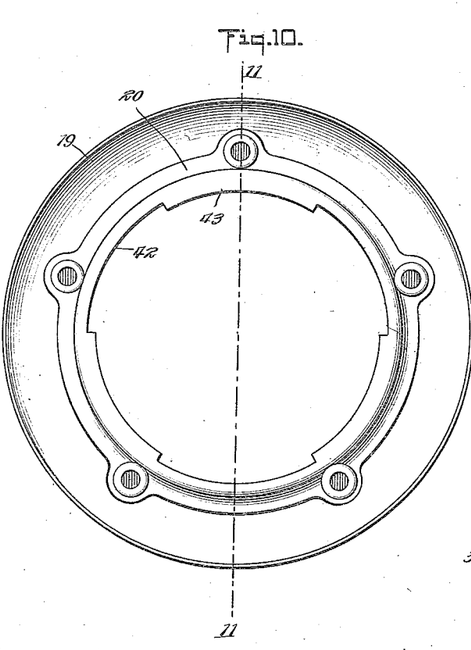
Figure 10 is a side elevation of the frame comprising posts or supports for journaling the swinging levers and the rings at either end of said posts or supports.
Figure 11:
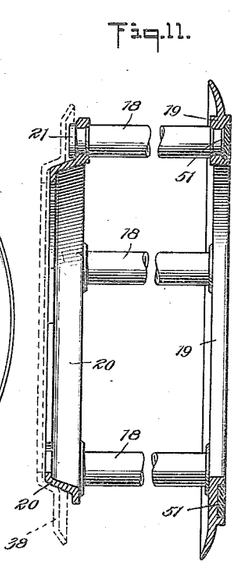
Figure 11 is a section on the line 11—11, Figure 10, parts being shown in elevation.
Figure 12:
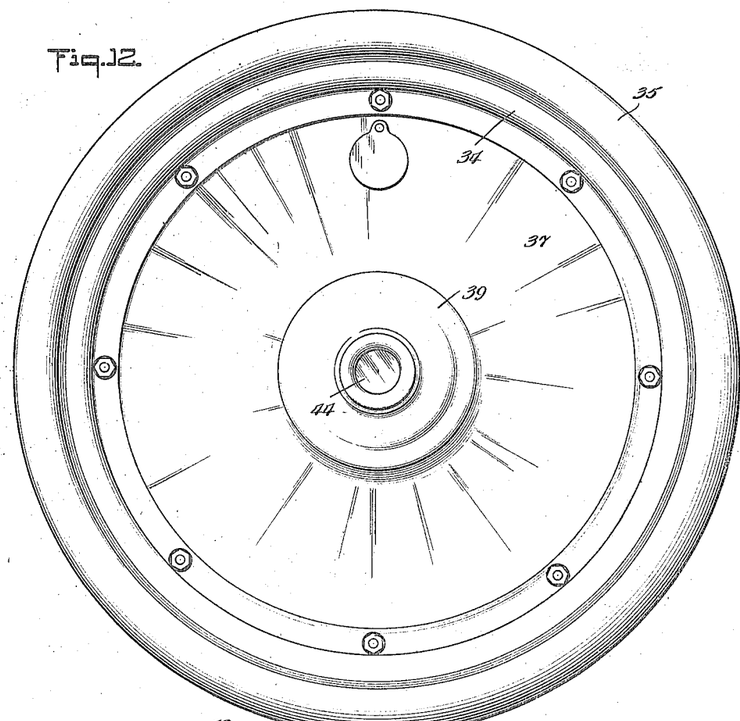
Figure 12 is a side elevation of the completed wheel.

In the embodiment of my invention shown on the drawings, a floating live axle 1 carries at its outer end a star wheel or plate 2 provided with peripherally spaced segments 3, which are disposed intermediately of the annular lugs 4 on the inner surface of a cylindrical wall 5, which constitutes an enlarged extension of a cylindrical wall 6, which forms the hub of an axle-engaging unit which runs on the Timken rollers 7 mounted in suitable raceways on the dead axle 8. Said axle-engaging unit also includes peripherally spaced groups of bearing lugs 9, the lugs of each group being alined parallel to the axis of the wheel. Extending thru each group of lugs 9 is a pivot pin 10 which is preferably made hollow to contain any suitable lubricant. Referring now to figures 5 and 6, it will be seen that a pair of links 11 are coaxially pivoted at their inner ends in each of the group of lugs 9, said links preferably having the form shown in Figure 8. Thus, each link 11 is provided with axially spaced pivot hubs 12 which are alternately arranged along the pin 10, the pivot hubs of one link being separated from the adjacent pivot lugs of the other link by means of the radially disposed bearing lugs 9. On their outer ends they carry axially spaced pivot bearings 13 which are symmetrically disposed with respect to a common central plane and journalled on the pivot pins 14 shown in Figure 7, said pivot pins 14 being carried in the spaced pivot bearings 15 of the levers 16. It will be understood, therefore, from an inspection of Figures 7 and 8 that the links 11 are all preferably similar in construction and the links of each pair are interchangeable since either one may be used in place of the other by merely reversing its position. This construction is of great convenience in manufacturing the wheel. The levers 16 are provided on their other ends with spaced bearings 17, by means of which they are journalled on a hollow post of support 18. These hollow posts or supports 18 upon which the lever 16 is journalled, are arranged substantially in radial alinement with the pivot lug groups 9, respectively. As shown in Figure 11, the posts or supports 18 are mounted in a ring 19 which constitutes part of a tread unit extending around and movably connected to the axle-engaging unit by means of the levers and links, just referred to. An outer ring 20 which is provided with suitably spaced holes to adapt it to fit over and unite the outer ends of the posts or supports 18, is secured in position by means of screw caps 21 which can be removed at will to permit the parts to be assembled or dismantled. Pivotally mounted on each of the pins 14 is a shoe 22 which is preferably constructed of sheet metal and has its lateral edges curved inwardly to adapt it to have rolling contact on the inner surface of a flexible band 23. A shoe 22 is also provided with inwardly deflected lugs 24 and intermediately spaced lugs 25 by means of which said shoe is pivoted on the pin 14. These lugs are shown in section in Figure 7 and in the assembled structure, are interposed between the pivot hubs 13 of the links and the pivot hubs 15 of the levers, a simple and efficient device being thereby provided for securing elongated bearings on the pivot axes which extend transversely to the plane of the wheel. This construction adapts the wheel to withstand the shocks and strains which tend to warp it. On each of the outer posts or supports 18 is mounted an anchoring cap 26 (see Figure 2) which is provided along its lateral edges with clips 27, adapting it to grip the post 18. Cylindrical flanges 28 at either end of the cap 26 have supporting engagement with either said post or the circular bosses on the ring 19 in which said posts are mounted. Said cap is provided with a centrally depressed portion 29 which forms a box for engaging the support 18 between the pivot hubs 17 of the lever 16. Adjacent either end, said cap is provided with a lug 30, said lug serving to locate the flexible band 23, hereinbefore referred to. This band 23 constitutes in effect a portion of the resilient member which opposes the departure of said axle and tread units from concentric position and also serves to transmit torque from one of said units to the other, either for driving the wheel or for braking the same. As preferably constructed, this resilient member is in the form of a pneumatic tube 31 which constitutes an improvement on a somewhat similarly placed pneumatic tube shown in my prior Patent No. 1289586, granted December 31st, 1918.

Figures 1, 2, 3, 4:
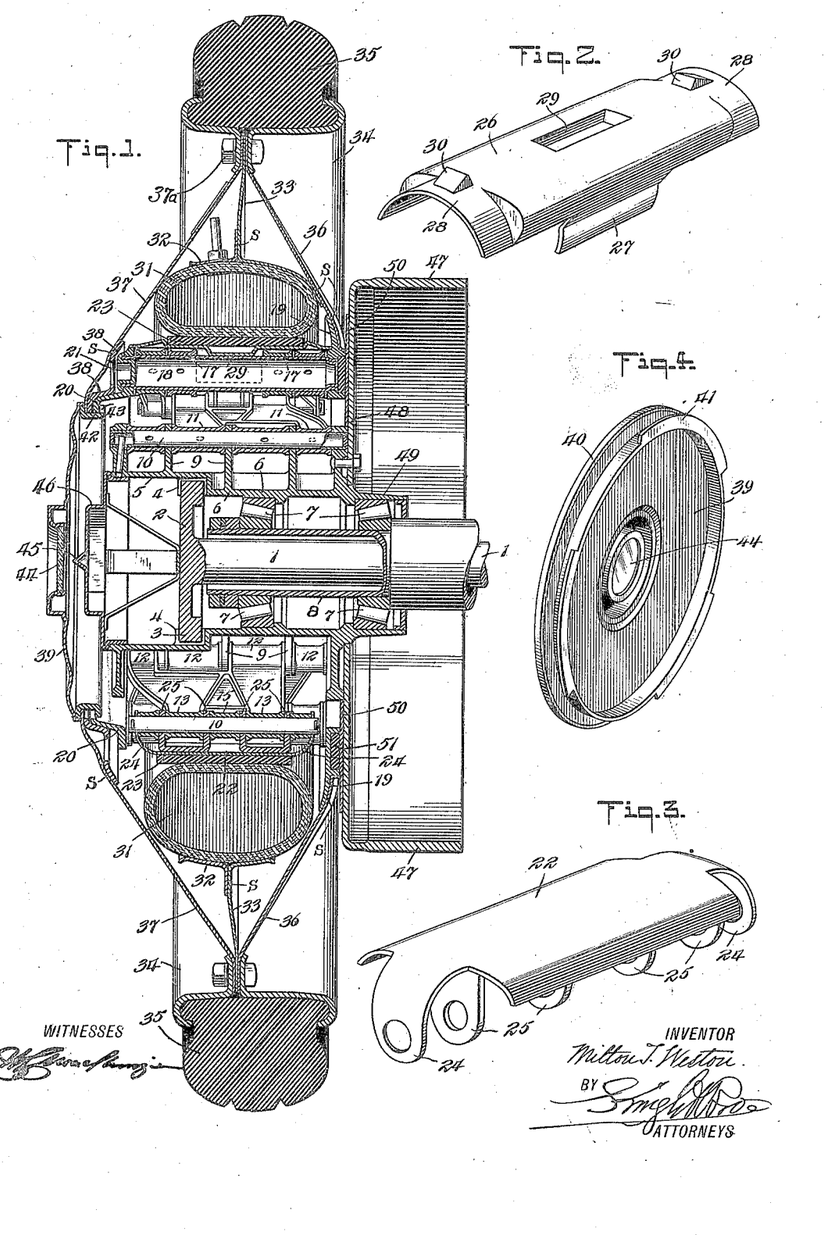
Figure 1 is an axial section thru the wheel, parts being shown in elevation.
Figure 2 is a perspective view of one of the band sustaining caps removed.
Figure 3 is a similar perspective view of one of the shoes removed.
Figure 4 is a perspective view from the inside of the removable cap which closes the central opening in the outside web of the wheel.

As shown in Figure 1, the flexible band 23 has considerable axial extent, and provides a broad confining surface with respect to the tube 31 which is flattened transversely between the flexible member or the flexible band 23 and a flat arched seat 32 for the outer periphery of said tube 31. The area of contact around the inner and outer peripheries of said tube 31 being thus greatly increased, the total pressure which is made available by this tube is very considerably multiplied without increasing the pressure of the air within the tube. Said tube therefore constitutes an improvemenet over the similarly disposed tube of the above-mentioned patent. The seat 32 is principally supported by an annular web 33 which is presented inwardly from the rim 34 on which is mounted the tire 35. An annular web 36 connects said rim to the ring 19 while another annular web 37 has its outer periphery connected by bolts 37ª to said rim 34. A ring 38 is connected by spot weld to the inner edge of the web 37. These parts are secured together by means of the web or closure shown in Figure 4 which comprises a metallic plate 39 provided with a peripheral flange 40 which limits its inward displacement and a number of segmental flanges 41 which are adapted to pass thru corresponding segmental recesses 42 formed in the inner periphery of the ring 20. After insertion, the cap is then rotated until its segmental flanges 41 become locked behind the segmental flanges 43 formed on the inner edge of ring 20, the parts being thereby sealed. It will be understood therefore that the web 37 is readily removed by removing the center web or closure (shown in Fig. 4), and taking the nuts from the bolts 37ª. This makes the pneumatic tube immediately accessible and in fact exposes the entire inner mechanism of the wheel. In the center of the cap 39 is provided a window 44 thru which may be observed a pointer 45 carried by a cap 46 which closes the outer end of the cylindrical wall 5. Since the pointer 45 partakes of the movements of the axle-engaging unit, while the window 44 partakes of the movement of the tread unit, the position of the pointer 45 in the window 44 serves to indicate the relative departure of said units from normal. A brake drum 47, carried by an annular plate 48 is mounted on the extension 49 of the cylindrical wall 6 of the axle unit, being preferably secured to said axle unit by means of a series of bolts or the like, which pass thru the plate 48 and adjacently disposed lugs 9. The plate 48 is provided on its outwardly presented surface with a sheet of metal 50 which has sealing contact with an annular packing strip 51 which is mounted in the ring 19. As a practical detail, it may be noted that such parts as the sheet metal webs, tube seat, and other parts, may be secured in their several relations by spot welding, as indicated at s in Figure 1.

The general principle of operation of my improved wheel is substantially similar to that of my above identified prior patent, there being, however, several important developments in the practical adaptation of my invention to render it more serviceable and efficient and to broaden its field of usefulness. Thus, in applying a flattened pneumatic tube to perform the functions of a resilient member between the relatively movable axle and tread units, not only is there a greater total pressure utilized in useful work than is available with a tube having a round cross section and equal air capacity, but at the same time it becomes possible to meet the demands of motor truck service in that the total amount of pressure in the resilient member is made sufficiently high without increasing the over-all diameter of the wheel. At the same time the effectiveness of the levers which oppose a departure of said elements from concentric relation and transmit torque from one unit to the other, is increased in corresponding degree. This in turn makes it possible to secure a more effective braking action from a brake drum carried by the axle-engaging unit. In the development of trucks for heavy traffic, it has been found necessary to resort to various devices for securing the necessary resiliency to prevent destructive vibration. In some instances, the size of the tire has been greatly increased. In other cases, twin tires have been resorted to. In most cases, an increase of air pressure within the tire has been used. In some cases, several of these expedients have been combined and with their inherent disadvantages added to the drawbacks connected with the use of a pneumatic tube for a traction tread. In adapting the present invention to the needs of the motor truck service, it has been found unnecessary to increase the radial extent of the pneumatic tube, or to raise the pressure of the air therein. The advantages of the hard cushion tread for traction purposes are retained. Nor is it necessary to employ twin or triple tubes for securing the required total pressure of resiliency in the wheel. In carrying out the practical details relating to the utilization of the increased pressure area in connection with the articulated links, the pressure transmitting shoes are pivotally mounted on said levers and suitably formed to provide a simple rocking movement over the interior surface of the band or resilient member during the series of equalizing changes of which these parts partake. In addition to certain constructional features hereinbefore described, by seating the outer periphery of the pneumatic tube upon a flattened arch carried by the inner peripheral edge of an annular web, it becomes possible to uncover the entire contents of the dust proof chamber formed between the lateral webs of the wheel. This structure is adaptable to an integral or a demountable rim. Around the wheel center, said dust proof chamber is sealed on one side by the brake drum and on the other side by the cap or closure which releasably secures the inner peripheral edge of the web to the ring which locks the outer ends of the posts or supports on which the levers swing in coaxial pairs. In effect also these posts or supports serve to unite the oppositely disposed side walls of the tread unit while at the same time serving as journals for the coaxially mounted pivot hubs of the paired levers.

Figure 13:
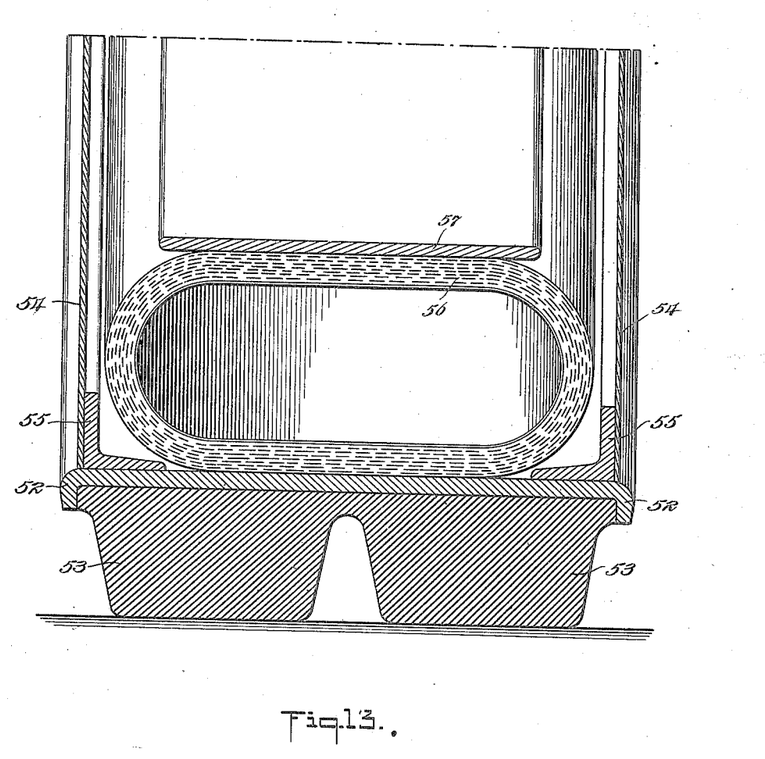
Figure 13 is a transverse section of the rim portion of a truck wheel constructed in accordance with the principles of my invention.

Referring now to Figure 13, my invention is shown in its peculiar adaptability to the physical and constructional requirements of truck wheels. According to this embodiment of my invention, a solid rim 52 serves to mount the double tire 53. Extending around the lateral peripheral edges of the rim 52 and secured thereto in any suitable manner, are the annular reenforcements 55 which serve to secure the webs 54 in position. The flattened pneumatic tube 56 is confined between the laterally extended rim 52 and band 57 which extends around the caps and shoes (not shown on this figure) which are supported by the articulated links and levers in a manner similar to that hereinbefore described. By thus confining the inner and outer peripheries of the pneumatic tube, it will be seen that the resilient pressure support between the axle-engaging and tread units is made equivalent to that available in connection with a tube of much larger size and having a substantially circular cross section. Not only is this so but I have ascertained by extended experimental use of an automobile wheel embodying a flattened pneumatic tube between articulately supported axle and tread units and running under actual service conditions, that a much lower pressure may be economically employed.

I claim:—

1. In a resilient wheel, an axle-engaging unit, a tread unit extending around said axle-engaging unit, means connecting said units and permitting relative movements between said units in the plane of said wheel, means carried by said tread unit for seating a pneumatic tube, a pneumatic tube seated around its outer periphery against said seating means, and means bearing against the inner periphery of said pneumatic tube and movable by and relatively to said units connecting means by the relative movement between said units.

2. In a resilient wheel, an axle-engaging unit, a tread unit extending around said axle-engaging unit, means for movably connecting said units, means carried by said tread unit for seating the flattened outer periphery of a pneumatic tube, a flattened pneumatic tube seated in said seating means, means carried by said tread unit for engaging portions of the inner flattened periphery of said tube, and a series of shoes engaging other portions of the inner flattened periphery of said tube, said shoes being movable relatively to said inner periphery engaging means by said units-connecting means.

3. In a resilient wheel, an axle-engaging unit, a tread unit surrounding the same, said tread unit being provided with means for seating the outer periphery of a pneumatic tube and with portions engaging said tube at points spaced around the inner periphery thereof, a pneumatic tube provided with flattened inner and outer peripheries, said tube being disposed between said outer periphery seating means and said inner periphery engaging portions, shoes bearing against the flattened inner periphery of said tube, and means movably connecting said units and moving said shoes relatively to the outer periphery seating means.

4. In a resilient wheel, an anxle-engaging unit, a tread unit surrounding the same, said tread unit having a seat for the outer periphery of a pneumatic tube, a series of supports carried by said tread unit at fixed distances from said seat, a pneumatic tube disposed between said seat and said supports, means movably connecting said units, and shoes arranged around the inner periphery of said pneumatic tube and connected with said units-connecting means to swing about said supports and about axes oscillatable about said supports.

5. In a resilient wheel, an axle-engaging unit, a tread unit surrounding the same, said tread unit having a seat for the outer periphery of a pneumatic tube, a series of supports carried by said tread unit at fixed distances from said seat, a pneumatic tube disposed between said seat and said supports, levers pivoted on said supports, links pivotally connecting said levers to said axle-engaging unit, and shoes movable relatively to said levers and transmitting pressure to the inner periphery of said pneumatic tube.

6. In a resilient wheel, an axle-engaging unit, a tread unit surrounding the same, said tread unit having a seat for the outer periphery of a pneumatic tube, a series of supports carried by said tread unit at fixed distances from said seat, a pneumatic tube disposed between said seat and said supports, a pair of levers coaxially pivoted to each of said supports, a shoe movably connected to each of said levers and actuated thereby to exert pressure against the inner periphery of said pneumatic tube, and links respectively connecting said levers to said axle-engaging unit.

7. In a resilient wheel, an axle-engaging unit, a tread unit surrounding the same, said tread unit having a seat for the outer periphery of a pneumatic tube, a series of supports carried by said tread unit at fixed distances from said seat, a pneumatic tube disposed between said seat and said supports, a pair of levers coaxially pivoted to each of said supports, a shoe movably connected to each of said levers and actuated thereby to exert pressure against the inner periphery of said pneumatic tube, and links respectively connecting said levers to said axle-engaging unit, each of said shoes having bearing lugs interposed between and on opposite sides of the pivotal bearings of the link and lever to which it is connected.

8. In a resilient wheel, a tread unit, an axle contacting unit, a pneumatic tube arranged to resist relative movements between said units, pivotally connected links and levers for articulately connecting said units, and pressure shoes pivotally mounted on the pivotal connections between said links and levers and bearing against said pneumatic tube.

9. In a resilient wheel, an outer rim, supports arranged in series at fixed distances from said rim, a pneumatic tube disposed between said rim and said supports, the relative disposition of said rim and supports being adapted to maintain said tube with its outer and inner peripheries flattened, means disposed intermediately of said supports for exerting variable pressure on the flattened inner periphery of said tube, an axle unit, and means movably connecting said supports to said axle unit and operating said variable pressure means.

10. In a resilient wheel, an axle unit, a tread unit provided with a seat flattened axially for axially flattening the outer periphery of a pneumatic tube extending around said axle unit, a series of axially extended supports carried by said tread unit at fixed distances from said seat for axially flattening the inner periphery of said tube, an axially flattened band extending around said supports, means for movably connecting said axle and tread units, axially flattened variable pressure means operated by said connecting means under the relative movement of said units to exert variable pressure thru said band against the inner periphery of said pneumatic tube, and a pneumatic tube confined between said seat and said band, said seat, supports, and variable pressure means being suitably disposed to maintain the outer and inner peripheries of said pneumatic tube in axially flattened condition.

11. A resilient wheel comprising axle contacting and tread units, means articulately connecting said units, a pneumatic tube, said units being provided with portions bearing against said pneumatic tube and suitably formed to impart a flattened contour to the inner and outer peripheries of said pneumatic tube, and means carried by said articulately connecting means for bearing on the increased pressure area portion provided by one of said flattened peripheries.

12. In a resilient wheel, an axle-engaging unit, a tread unit extending around said axle-engaging unit, a series of swinging levers pivoted to one of said units, said levers having means provided with operating surfaces in substantially circular alinement with their pivots, links pivotally connecting said levers respectively to the other unit for imparting movements to said operating surfaces with respect to said pivots, and a pneumatic tube interposed between said tread unit and said levers, said levers being arranged in pairs with their corresponding ends coaxially pivoted to the tread unit, and said links having their corresponding ends coaxially pivoted in said axle-engaging member.

13. In a resilient wheel, an axle-engaging unit, a tread unit extending around said axle-engaging unit, a series of swinging levers pivoted to one of said units, said levers having means provided with operating surfaces in substantially circular alinement with their pivots, links pivotally connecting said levers respectively to the other unit for imparting movements to said operating surfaces with respect to said pivots, and a pneumatic tube interposed between said tread unit and said levers, said levers being arranged in pairs with their corresponding ends coaxially pivoted to the tread unit, and said links having their corresponding ends coaxially pivoted in said axle-engaging member, each of said levers and the link connected thereto having a pivot hub portion arranged between the hub portions of the link or lever connected thereto.

14. In a resilient wheel, an axle-engaging unit, a tread unit extending around said axle-engaging unit, a series of swinging levers arranged in pairs, each pair of said levers being pivoted to one of said units on a common axis and having spaced pivot hub portions straddling a pivot hub portion of the other lever, links connecting said levers to the other of said units, said links being arranged in pairs corresponding to said levers and each of said links having divided hub portions at each end for providing elongated coaxial pivotal connection with the other link on said other unit and with the lever to which it is attached, a wheel rim, and resilient means operating through said levers for resisting relative displacement between said units.

15. In a resilient wheel, an axle-engaging unit, a plurality of links pivoted thereto, a tread unit extending around said axle-engaging unit, levers respectively connecting said links to said tread unit, a wheel rim, and yieldable means interposed between said tread unit and said levers, each of said levers and links being provided with spaced coaxial pivot hub portions at each end, and an axially extending body portion from which said pivot hub portions project.

16. In a wheel, an axle-engaging unit, a tread unit surrounding said axle-engaging unit, one of said units including axially spaced frames and a plurality of journal pins uniting said frames, a pair of levers journaled on each of said journal pins, a system of links pivotally connecting said levers with the other of said units, and resilient means extending around said levers, said tread unit being provided with means between which and said levers said resilient means interacts.

17. In a wheel, an axle-engaging unit, a tread unit surrounding said axle-engaging unit, one of said units including axially spaced frames and a plurality of journal pins uniting said frames, a pair of levers coaxially journaled on each of said journal pins, a pair of links pivotally connecting each pair of said levers with the other of said units, each pair of links being coaxially pivoted on said other unit, and resilient means extending around said levers, said tread unit being provided with means between which and said levers said resilient means interacts.

18. In a wheel, an axle-engaging unit, a tread unit surrounding said axle-engaging unit, said tread unit including axially spaced frames, journal pins connecting said frames, levers journaled on said pins, links pivotally connecting said levers to said axle-engaging unit, a series of anchoring caps carried respectively by said journal pins, and yieldable means disposed between said levers and portions carried by said tread unit, said yieldable means being anchored by said anchoring caps.

19. In a wheel, an axle-engaging unit, a tread unit surrounding said axle-engaging unit, said tread unit including axially spaced frames, journal pins connecting said frames, levers journaled on said pins, links pivotally connecting said levers to said axle-engaging unit, a series of anchoring caps carried respectively by said journal pins, and yieldable means disposed between said levers and portions carried by said tread unit, each of said anchoring caps being provided with yieldable wings for releasably gripping said journal pins and means interlocking with said yieldable means.

20. In a wheel, an axle-engaging unit, a tread unit surrounding the same, said tread unit including axially spaced rings and a series of journals extending transversely between said rings, levers journaled on said journals, links pivotally connected at opposite ends to said levers and axle engaging unit, said levers being provided with axially spaced pivot hub portions, anchoring caps supported by said pivot hub portions and provided with lugs or bosses which engage said journals between said pivot hub portions, resilient means extending around said levers and anchoring caps, and means carried by said tread unit and between which and said levers and shoes said resilient means is disposed.

21. In a resilient wheel, axle contacting and tread units, a pneumatic tube for yieldably resisting relative displacement of said units, and means movably connecting said units and bearing upon said pneumatic tube, the bearing portions of said connecting means in the concentric relation of said units being normally disposed to maintain flattened increased pressure areas of contact on said pneumatic tube.

22. In a resilient wheel, a tread unit having a seat for the periphery of a pneumatic tube, a series of supports carried by said tread unit at fixed distances from said seat, a pneumatic tube disposed between said seat and said supports, an axle contacting unit, and means for movably connecting said units and bearing on said pneumatic tube, said connecting means including a pair of levers coaxially pivoted to each of said supports and links respectively connecting said levers to said axle contacting unit.

23. In a resilient wheel, a tread unit having a seat for the periphery of a pneumatic tube, a series of supports carried by said tread unit at fixed distances from said seat, a pneumatic tube disposed between said seat and said supports, an axle contacting unit, and means for movably connecting said units and bearing on said pneumatic tube, said connecting means including a pair of levers coaxially pivoted to each of said supports and links respectively connecting said levers to said axle contacting unit, said links being interchangeable.

24. In a resilient wheel, a tread unit, an axle-contacting unit, links and levers for movably connecting said units, a pneumatic tube, and a pressure shoe pivotally connected to each of said levers and bearing on said pneumatic tube, said shoes being movable by and relatively to the relative movements between said units.

25. In a resilient wheel, a tread unit, an axle contacting unit, one of said units being provided with transverse supports, a pneumatic tube extending around said supports, means acting under the constraint of said pneumatic tube for movably connecting the other of said units to said transverse supports, a band interposed between said pneumatic tube on the one hand and said transverse supports and connecting means on the other hand, and a cap interposed between each of said supports and said band.

26. In a resilient wheel, a tread unit, an axle contacting unit, one of said units being provided with transverse supports, a pneumatic tube extending around said supports, means acting under the constraint of said pneumatic tube for movably connecting the other of said units to said transverse supports, a band interposed between said pneumatic tube on the one hand and said transverse supports and connecting means on the other hand, and a cap interposed between each of said supports and said band, said caps being provided with lugs for centering said band with respect to said pneumatic tube and the portions of said connecting means constrained thereby.

27. In a resilient wheel, relatively movable tread and axle contacting units, one of said units being provided with transversely arranged journalling supports, a pneumatic tube extending around said journalling supports, a band interposed between said pneumatic tube and said supports, levers journalled on said supports and constrained in their movements by said pneumatic tube, links pivotally connecting said levers to the other of said units, and caps bearing on said journalling supports and portions contiguous thereto, said caps extending over the bearing portions of said levers and holding said band from bearing thereon.

28. In a resilient wheel, relatively movable axle contacting and tread units, a pneumatic tube, levers pivotally mounted on one of said units, links pivotally mounted on the other of said units, pins for pivotally connecting said links and levers, and pressure shoes pivotally mounted on said pivotal pins and constrained in their movements by said pneumatic tube for yieldably resisting relative movements between said units.

29. In a resilient wheel, relatively movable tread and axle contacting members, means for movably connecting said units, said means being provided with portions adapted to bear on a pneumatic tube for resisting relative movements between said units, a seat for said pneumatic tube carried by one of said units, and a pneumatic tube disposed between said seat and the bearing portions of said connecting means, the distance between said bearing portions of the connecting means and said seat when said units are in concentric relation, being relatively small as compared to the axial extent of the flattened pneumatic tube confined between said seat and said bearing portions of the connecting means.

30. In a resilient wheel, a tread unit provided with a seat for a pneumatic tube, an axle contacting unit, means for movably connecting said units including members adapted to bear on said pneumatic tube, and a pneumatic tube confined between said seat and bearing members, said pneumatic tube in its cross section being of relatively small radial extent as compared to its axial width and having axially extended bearing contact with said bearing members around an axially flattened periphery thereof.

MILTON T. WESTON.